US006962210B1

(12) United States Patent
Redenius

(10) Patent No.: US 6,962,210 B1
(45) Date of Patent: Nov. 8, 2005

(54) AGRICULTURAL IMPLEMENT CONNECTION SYSTEM

(75) Inventor: Mitchell Redenius, West Des Moines, IA (US)

(73) Assignee: Hagie Manufacturing Co., Clarion, IA (US)

(*) Notice: Subject to any disclaimer, the term of this patent is extended or adjusted under 35 U.S.C. 154(b) by 256 days.

(21) Appl. No.: 10/319,339

(22) Filed: Dec. 12, 2002

(51) Int. Cl.⁷ .............................. A01B 51/00; E02F 3/00
(52) U.S. Cl. ....................................... 172/274; 414/723
(58) Field of Search ................................ 172/272–275, 172/439; 37/466, 468, 231, 236, 901; 414/723, 414/724, 722, 912

(56) References Cited

U.S. PATENT DOCUMENTS

| | | | | |
|---|---|---|---|---|
| 5,078,569 A | * | 1/1992 | Cook | 414/723 |
| 5,224,816 A | * | 7/1993 | Kaczmarczyk et al. | 414/723 |
| 5,263,810 A | * | 11/1993 | Takekata et al. | 414/723 |
| 5,419,673 A | * | 5/1995 | Merhar | 414/723 |
| 5,590,483 A | * | 1/1997 | Kim | 37/468 |
| 5,692,855 A | * | 12/1997 | Burton | 403/325 |
| 6,491,306 B2 | | 12/2002 | Schaffer | |

* cited by examiner

Primary Examiner—Robert E Pezzuto
(74) Attorney, Agent, or Firm—Brett Trout

(57) ABSTRACT

An agricultural implement connection assembly. The assembly has a plurality of hooked tongues secured to a four bar parallel linkage associated with an agricultural implement. The tongues are designed to fit into mating engagement with a similar plurality of grooves defined by a frame coupled to an agricultural vehicle. Hydraulic lines from the agricultural vehicle are coupled to the agricultural implement to lift the agricultural implement into mating engagement with the grooves and then lowered until the hooks engage cleats provided at the tops of the grooves. A locking pin assembly is provided through the groove frames and tongues to secure the tongues within the grooves. The locking mechanism has a spring actuated bias system which maintains the locking pins out of engagement with the tongues for attachment and detachment, and also biases the locking pins into engagement with the tongue during transport, storage and use of the agricultural implement.

13 Claims, 6 Drawing Sheets

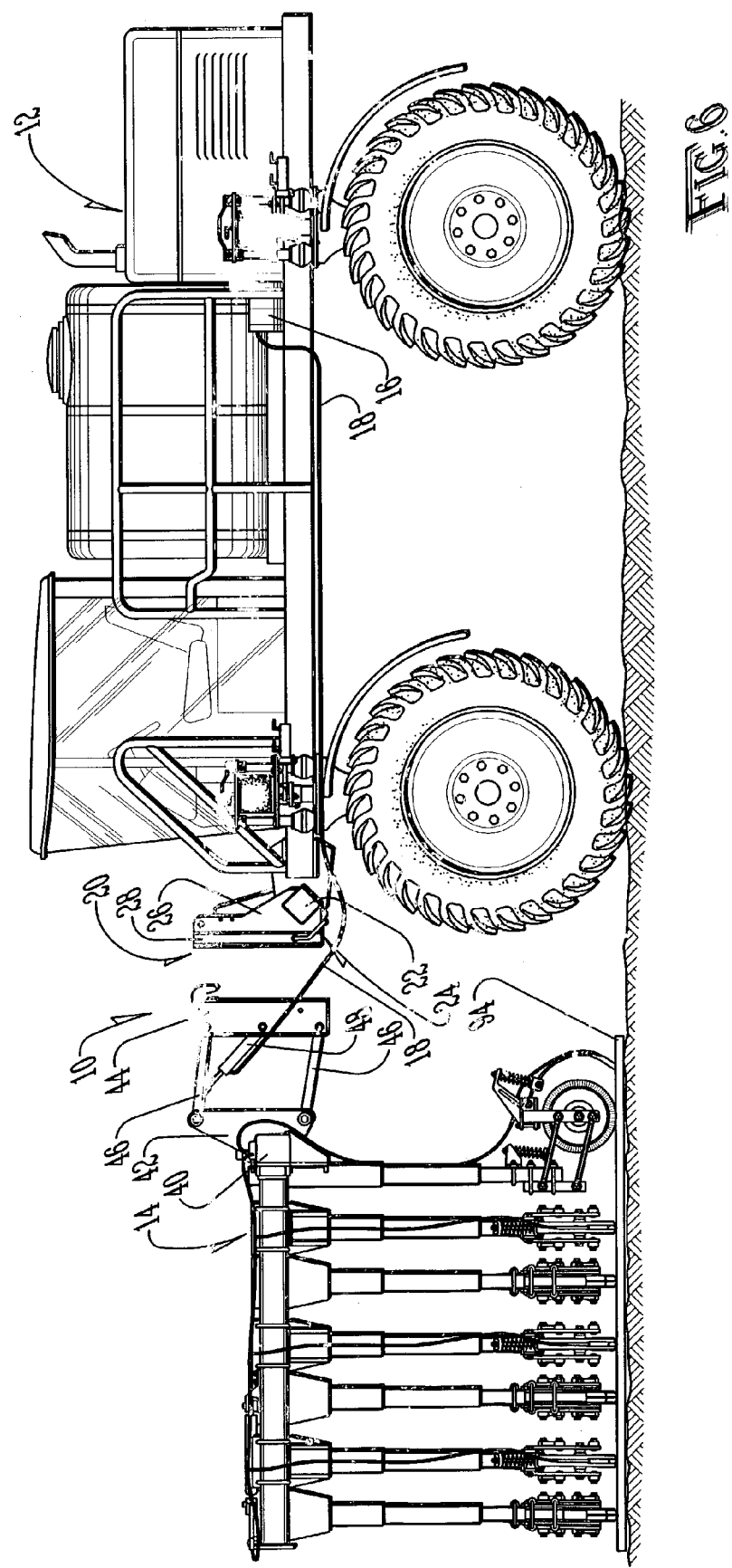

AGRICULTURAL IMPLEMENT CONNECTION SYSTEM

BACKGROUND OF THE INVENTION

1. Field of the Invention

The present invention relates to a connection system for an agricultural implement and, more particularly, to a quick connect system for quickly and securely connecting an agricultural implement to an agricultural vehicle 2. Description of the Prior Art High clearance agricultural vehicles such as row crow nitrogen applicators are well known in the art. Such systems typically include a high clearance tractor and a toolbar. The toolbar may be of any type known in the art and may be used to apply nitrogen fertilizer, detassel corn, or any of a myriad of other uses. By providing a plurality of toolbars, for a single vehicle, costs associated with the acquisition, storage and maintenance of multiple vehicles is eliminated.

One drawback associated with prior art vehicles and toolbars is the time and difficulty associated with connecting and disconnecting various toolbars from the agricultural vehicle. As such connections are often completed by an individual, the connection and disconnection process involve a considerable amount of time with the operator moving back and forth between the connection point and either the vehicle or toolbar to assure the exact alignment required for connection. It would, therefore, be desirable to provide a quick connection assembly for the quick connection and decoupling of toolbars from such high clearance vehicles. The difficulties encountered in the prior art discussed hereinabove are substantially eliminated by the present invention.

SUMMARY OF THE INVENTION

In an advantage provided by this invention, a system is provided for quickly securing an agricultural implement to an agricultural vehicle.

Advantageously, this invention provides an agricultural implement connection assembly which is low cost and simple to manufacture.

Advantageously, this invention provides a system for securely mounting an agricultural implement to an agricultural vehicle.

Advantageously, this invention provides for quick mounting of an agricultural implement to an agricultural vehicle not having the capability of a height adjusting mounting plate.

In an embodiment of this invention, a system is provided for connecting an agricultural implement to an agricultural vehicle comprising a mounting assembly coupled to the agricultural vehicle and a retaining member coupled to the agricultural implement. A lock mechanism secures the two to one another. In the preferred embodiment, the mounting assembly includes a cleat and a frame defining a groove. The retaining member comprises a hook, a tongue and a catch. When mounting the retaining member to the mounting assembly, the tongue is provided within the groove and a keeper associated with the lock mechanism secures through the frame to the tongue. The lock mechanism also includes first means for maintaining the keeper in an engagement position in engagement with the catch, and second means for maintaining the keeper in a non-engagement position, out of engagement with the catch.

BRIEF DESCRIPTION OF THE DRAWINGS

The present invention will now be described, by way of example, with reference to the accompanying drawings, in which:

FIG. 6 illustrates a side elevation of the agricultural vehicle disconnected from the agricultural implement.

DETAILED DESCRIPTION OF THE PREFERRED EMBODIMENT

Figure 1:
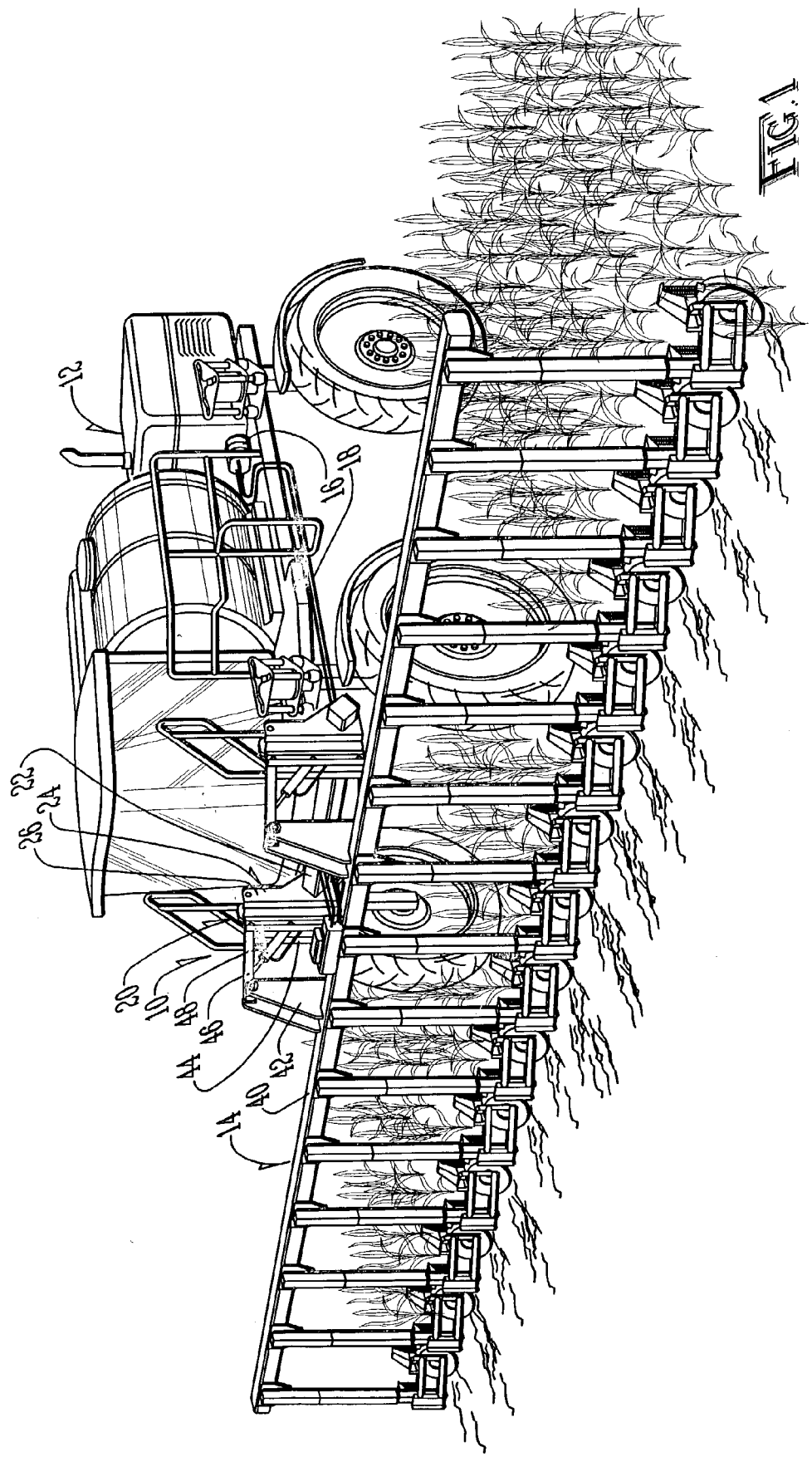
FIG. 1 illustrates a perspective view of the agricultural vehicle and agricultural implement coupled thereto.

With reference to the drawings, the implement connection system of the present invention is shown generally as (10) in FIG. 1. The implement connection system (10) couples an agricultural vehicle (12) to an agricultural implement (14), such as a toolbar. While the vehicle (12) may be of any type known in the art, in the preferred embodiment the vehicle (12) is an STS12 Sprayer, manufactured by Hagie Manufacturing Company of Clarion, Iowa. U.S. Pat. No. 6,371, 237 is incorporated herein by this reference. The agricultural implement (14) is preferably a toolbar such as those known in the art to apply nitrogen fertilizer or pesticides to crops.

Figure 2:
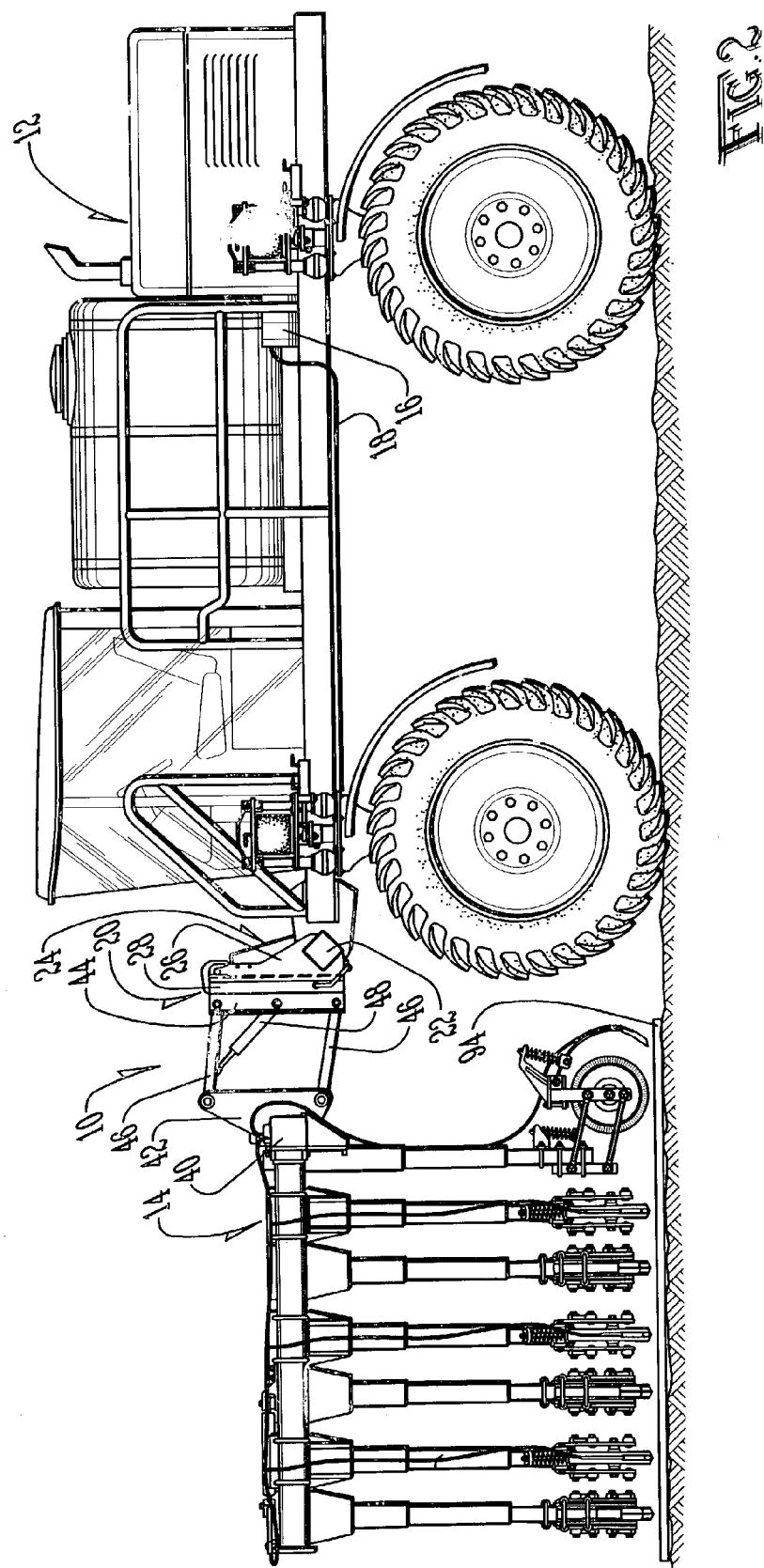
FIG. 2 illustrates a side elevation of the agricultural vehicle and agricultural implement of FIG. 1.
Figure 3:
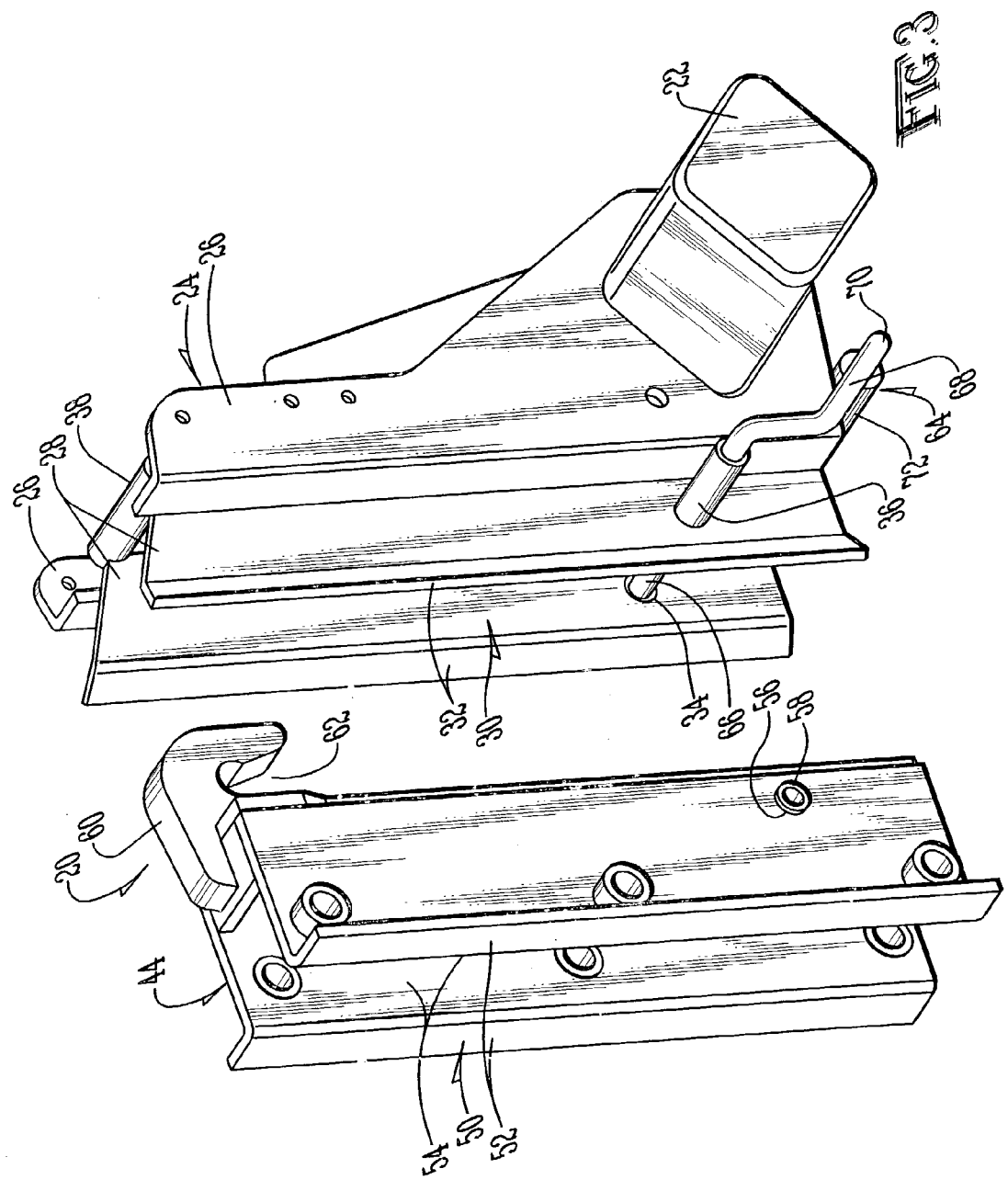
FIG. 3 illustrates a front perspective view in partial cutaway of the mounting assembly retaining member and lock mechanism of the present invention.

The vehicle (12) is provided with a hydraulic motor (16), coupled in a manner such as that well known in the art to a plurality of hydraulic lines (18). As shown in FIG. 2, the agricultural vehicle (12) is provided with a mounting assembly (20). As shown in FIGS. 2 and 3, the mounting assembly (20) includes a crossbar (22) coupled to a pair of frames (24). Although the frames (24) and crossbar (22) may be constructed of any suitable material, in the preferred embodiment, they are constructed of steel, or other similarly rigid material. As the frame (24) are mirror images of one another, description will be limited to a single frame (24). As shown in FIG. 3, the frame (24) includes a pair of steel shoulders (26) welded or otherwise secured to a pair of guide plates (28) defining an interior groove (30). As shown, the guide plates (28) are preferably provided with flared edges (32). The guide plates (28) are also provided with holes (34). Welded over one of the holes (34) is a steel cylinder (36). Welded to the guide plates (28) is a cleat (38). Although the cleat (38) may be of any desired construction, in the referred embodiment, the cleat (38) is constructed from a solid bar of steel.

As shown in FIG. 2, coupled to the agricultural implement (14) is a mounting bar (40), constructed of a steel tube having a substantially square cross section. Coupled to the mounting bar (40) are a pair of shoulder plates (42), welded or otherwise secured to the mounting bar (40). The shoulder plates (42) are coupled to a pair of retaining members (44) by a four bar parallel linkage (46), such as those well known in the art, to maintain the shoulder plates (42) and the retaining members (44) parallel to one another as the shoulder plates (42) and retaining members (44) raise and lower in relationship to one another. Coupled between the retaining members (44) and four bar parallel linkage (46) are a pair of hydraulic cylinders (48) which, in turn, are coupled to the hydraulic lines (18) coupled to the hydraulic motor (16) of the agricultural vehicle (12). (FIGS. 1–3). As shown in FIG. 3, each retaining member (44) is constructed of a generally u-shaped steel bar (50), provided with a pair of outward extending lips (52). The bar (50) defines a tongue constructed of dimensions suitable for insertion into the groove (30) defined by the guide plates (28). Provided through the sides (54) of the bar (50) are a pair of holes (56) of a size substantially similar to the holes (34) provided in the guide plates (28). Both sets of holes (34) and (56) are preferably reinforced with hardened steel grommets (58), welded or otherwise secured to the guide plates (28) and bar (50).

Welded or otherwise secured to the top of the bar (50) is a hook (60), constructed of thick hardened steel sufficient to support the weight of the agricultural implement (14). The hook (60) is provided with a gap (62) sufficient to accommodate the cleat (38). As shown in FIG. 3, a lock mechanism (64) is provided to secure the retaining members (44) to the mounting assembly (20). The lock mechanism (64) includes a lock shaft (66) provided through the steel cylinder (36) and having dimensions sufficient to pass through the holes (34) and (56) when the bar (50) is secured within the groove (30). Welded to the lock shaft (66) is a handles (68) which curves downward and rearward from the lock shaft (66). Also welded to the handles (68) is a keeper shafts (70).

Figure 4:
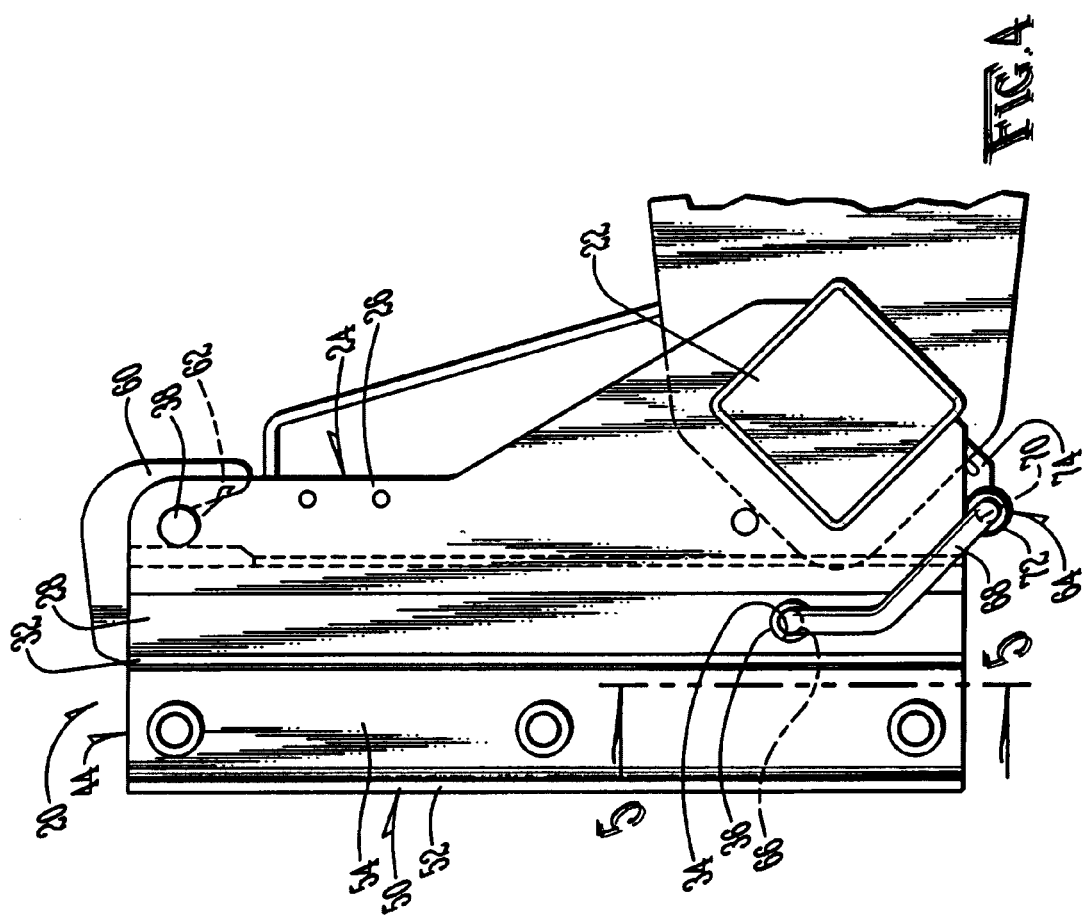
FIG. 4 illustrates a side elevation in partial phantom, showing the retaining member coupled to the mounting assembly by the lock mechanism.

As shown in FIG. 4, the keeper shafts (70) is provided within a cylindrical steel keeper housings (72) which, in turn, is welded to a bracket (74) mounted to the frame (24).

Figure 5:
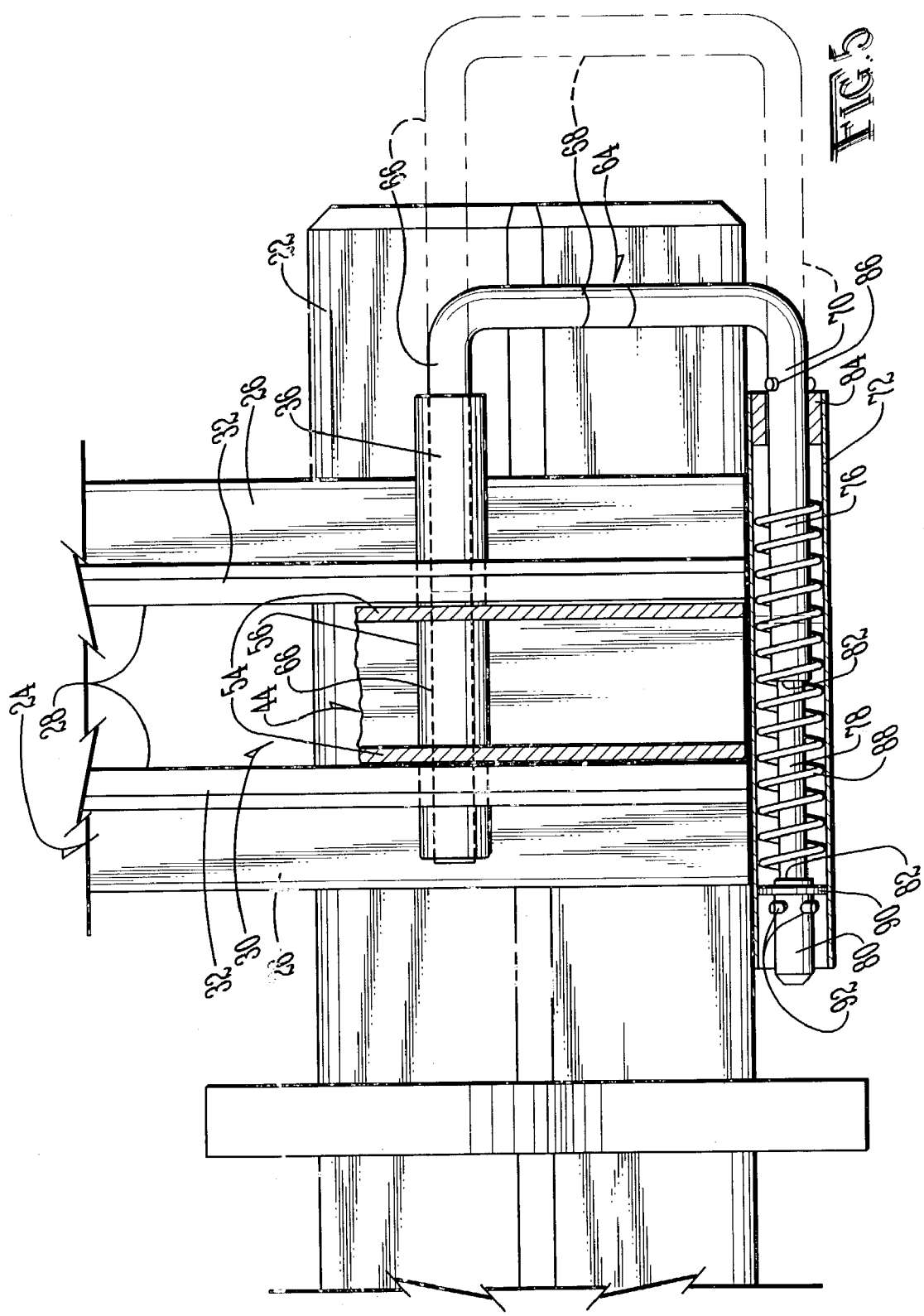
FIG. 5 illustrates a top elevation in partial phantom, showing the shaft housing and spring assembly associated with the lock mechanism.

As shown in FIG. 5, the keeper shafts (70) is a steel bar having a head section (76), mid-section (78) and tail section (80), wherein the head section (76) and tail section (80) of the shafts (70) are substantially similar in diameter with the mid-section (78) being of a smaller diameter, creating a lip (82) at the interface between the sections. Provided within the housings (72) is a bushings (84), welded or otherwise secured to the housings (72). The exterior diameter of the bushings (84) is preferably substantially similar to the interior diameter of the housings (72), while the interior diameter of the bushings (84) is substantially similar to the exterior diameter of the head section (76) of the keeper shafts (70). Two roll pins (86) are preferably provided in the head section (76) of the keeper shafts (70) outside of the housings (72) to prevent the shafts (70) from extending into the housings (72) beyond the roll pins (86). Provided around the shafts (70) inside the housings (72) is a steel spring (88).

As shown in FIG. 5 provided around the tail section (80) of the shafts (70) is a washer (90). A pair of roll pins (92) are also provided around the tail section (80) and biased into contact with the roll pins (92) by the spring (88). Accordingly, to operate the agricultural implement connection system (10) of the present invention, the agricultural vehicle (12) pulls up to the agricultural implement (14). The agricultural implement (14) is preferably resting on a wood or metal support (94) to maintain the agricultural implement (14) out of contact with the ground. (FIGS. 2 and 5). Hydraulic lines (18) from the agricultural vehicle (12) are coupled to the hydraulic cylinders (48) of the agricultural implement (14), which are actuated to cause the four bar parallel linkage (46) of the agricultural implement (14) to raise or lower to the point where the hooks (60) of the retaining members (44) are positioned just above the cleat (38) associated with the mounting assembly (20).

To prepare the mounting assembly (20), the handles (68) are pulled away from the guide plates (28) a sufficient distance to allow the lips (82) of the keeper shafts (70) to exit past the bushings (84) of the keeper housings (72). (FIGS. 2, 3 and 5). Once the lips (82) have exited the bushings (84), the handles (68) are pulled slightly forward to rest the lips (82) on the bushings (84). The bias of the springs (88) prevents the lips (82) from becoming inadvertently dislodged from the bushings (84). The agricultural vehicle (12) is then moved forward until the bars (50) of the retaining members (44) rest within the grooves (30) of the mounting assembly (20). If the bars (50) are slightly out of line, the flared edges (32) of the guide plates (28) redirect the bars (50) into proper "tongue and groove" engagement with the guide plates (28). Thereafter, the four bar parallel linkage (46) is actuated to lower the hooks (60) onto the cleats (38). Once the bars (50) have engaged the grooves (30), the handles (68) is again grasped and moved slightly rearward until the head section (76) of the keeper shafts (70) are aligned with the bushings (84). The handles (68) are then released, causing the springs (88) to bias the keeper shafts (70) into the housings (72). As the keeper shafts (70) move into the keeper housings (72), the handles (68) cause the lock shafts (66) to pass through the steel cylinder (36), holes (56) and (34), thereby locking the bars (50) into engagement with the grooves (30) against the guide plates (28). The hydraulic motor (16) of the agricultural vehicle (12) may then be used to raise, lower or otherwise manipulate the agricultural implement (14).

When it is desired to remove the agricultural implement (14) from the agricultural vehicle (12), the agricultural vehicle (12) is driven to position the agricultural implement (14) over the support (94). (FIGS. 3, 5 and 6). The handles (68) are then pulled inward, causing the lock shafts (66) to disengage from the bars (50). The handles (68) are pulled sufficiently outward to move the head sections (76) of the keeper shafts (70) beyond the bushings (84). The handles (68) are then rotated slightly forward to rest the lips (82) of the keeper shafts (70) on the bushings (84). The hydraulic motor (16) is then actuated to cause the four bar parallel linkage (46) to raise the agricultural implement (14) relative to the agricultural vehicle (12). The hydraulic motor (16) then continues to raise the agricultural implement (14) until the hooks (60) clear the cleats (38). The hydraulic lines (18) are then disengaged from the agricultural implement (14) and the agricultural vehicle may then be transported for storage or connected to another agricultural implement.

Although the invention has been described with respect to a preferred embodiment thereof, it is to be understood that it is not to be so limited, since changes and modifications can be made therein which are within the full intended scope of this invention as defined by the appended claims. For example, it is anticipated that any type of lock mechanism may be substituted for the lock shaft (66) and any type of keeper mechanism may be substituted for the hooks (60) and cleats (38). It is further anticipated that any number, size, construction, dimensions or materials may be used to construct the mounting assemblies (20) and retaining members (44).

What is claimed is:
1. A release system comprising:
 (a) a mounting assembly comprising:
  (i) a frame defining a groove; and
  (ii) a cleat;
 (b) a retaining member comprising:
  (i) a hook;
  (ii) a tongue; and
  (iii) a catch;

(c) a lock mechanism comprising:
   (i) keeper;
   (ii) first means for maintaining said keeper in an engagement position in engagement with said catch; and
   (iii) second means for maintaining said keeper in a non-engagement position out of engagement with said catch;
(d) a vehicle coupled to said mounting assembly in a fixed relationship relative thereto;
(e) an implement coupled to said retaining member in a pivotal relationship relative thereto; and
(f) means coupled to said implement for pivoting said implement relative to said retaining member.

2. The release system of claim 1, wherein said catch comprises a portion of said retaining member defining a hole.

3. The release system of claim 2, wherein said keeper is a pin of a diameter capable of extending at least partially into said hole.

4. The release system of claim 1, wherein said keeper is a pin.

5. The release system of claim 1, wherein said first means is a spring.

6. The release system of claim 1, wherein said second means is a shaft having a first diameter and a second diameter.

7. The release system of claim 1, wherein said keeper comprises a pin, said first means comprises a spring and said second means comprises a shaft having a first diameter and a second diameter.

8. The release system of claim 7, further comprising a handle coupling said pin to said shaft.

9. The release system of claim 8, further comprising a housing having a lip and defining an interior, wherein said spring is provided within said housing.

10. A release system comprising:
(a) a frame defining a groove;
(b) a hook;
(c) a tongue coupled to said hook, said tongue defining a slot;
(d) a pin;
(e) first means for maintaining said pin at least partially within said slot;
(f) second means for maintaining said pin out of engagement with said slot; and
(g) a vehicle coupled to said frame in a fixed relationship relative thereto;
(h) an implement coupled to said hook in a pivotable relationship relative thereto; and
(i) means coupled to said implement for pivoting said implement relative to said hook.

11. The release system of claim 10, wherein said first means comprises a spring and said second means comprises a shaft having a first diameter and a second diameter.

12. The release system of claim 11, further comprising a handle coupling said pin to said shaft.

13. The release system of claim 12, further comprising a housing having a lip and defining an interior, wherein said spring is provided within said housing.

* * * * *